March 13, 1945. G. D. SCOTT 2,371,553
HYDRAULIC MECHANISM FOR MACHINE TOOLS AND THE LIKE
Filed June 8, 1942
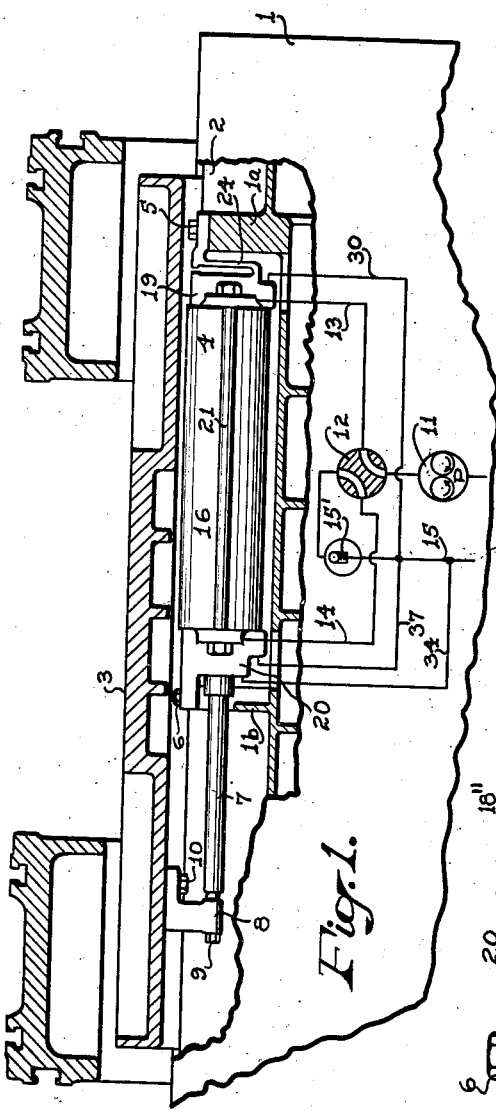
Inventor
Gherald D. Scott
By Geo. H. Kennedy Jr.
Attorney Patented Mar. 13, 1945

2,371,553

UNITED STATES PATENT OFFICE 2,371,553

HYDRAULIC MECHANISM FOR MACHINE TOOLS AND THE LIKE

Gherald D. Scott, Worcester, Mass., assignor to The Heald Machine Company, Worcester, Mass., a corporation of Massachusetts Application June 8, 1942, Serial No. 446,255

1 Claim. (Cl. 121—45)

The present invention relates to improvements in hydraulic systems such as are used, for example, in the actuation of reciprocatory tables or carriages on various kinds of machine tools.

In such a machine, using an hydraulic motor in the form of a cylinder and piston for producing the reciprocation between the parts, it is customary to secure the cylinder either to the table or to the machine base; in either case, longitudinal expansion of the cylinder as the pressure fluid heats up, will cause some distortion of the part to which it is attached, which adversely affects the alignment between the reciprocating part and its ways, and thereby increases the friction and wear between the parts.

Also in such a cylinder and piston unit, it is customary to use a packing material around the piston rod to prevent leakage and loss of effectiveness of the pressure fluid in the cylinder. The packing is squeezed against the rod, introducing friction and wear, which necessitates frequent renewal of the packing; frequently also the piston rod becomes scored and has to be replaced.

One of the principal objects of this invention is to provide such a cylinder and piston unit so arranged that any longitudinal expansion of the cylinder due to heating up will occur in the absence of any distortion of the member to which said cylinder is attached.

Another object of this invention is to provide a cylinder and piston unit wherein the piston rod is a substantially floating member, unconfined by packing used to prevent leakage, whereby friction and wear is reduced to a minimum.

It is another object of this invention to provide a cylinder and piston unit having improved means for collecting any air that has been entrained in the oil or other pressure fluid, and for expelling such air from the system.

Another object of this invention is to provide such a cylinder and piston unit with means to cushion the end of the stroke of the piston and means to release the piston from the cushioning means on the reverse stroke.

A further object of this invention is to provide a piston, using piston rings, of novel design with means whereby the width of the ring grooves can be adjusted.

Other and further objects will be apparent from the following detailed description taken in conjunction with the drawing, in which, Fig. 1 is a part sectional view, showing the cylinder and piston unit of my invention in assembled relation on a machine tool base, and with the hydraulic system shown schematically.

Fig. 2 is an enlarged sectional view of said cylinder and piston unit.

Fig. 3 is an enlarged detail view of one end of the piston.

Like reference characters refer to like parts in the different figures.

Fig. 1 shows fragmentarily the base 1 of a machine tool, having the usual longitudinal ways 2 for reciprocation of a table 3. Below said table is arranged the piston and cylinder unit 4, by which table 3 is actuated, the base 1 for the attachment of this unit having spaced portions 1a and 1b, receiving bolts 5 and 6 respectively, by which to anchor, as hereinafter described, the heads or end caps 19, 20 of the cylinder of said unit 4. The piston of said unit provides a rod 7 extending from one end of said unit which is fastened to a bracket 8 by means of a nut 9, the said bracket being secured to the under side of the table 3 by means of bolts 10, whereby reciprocation of the piston is imparted to the table.

Fluid under pressure is supplied to the unit by means of a pump 11 which delivers the fluid to a reversing valve 12, associated with suitable conduits 13 and 14 leading to the right and left hand ends of the cylinder of unit 4 and also with an exhaust conduit 15. Operation of the valve 12 to alternately connect the ends of the cylinder to pressure and exhaust, is accomplished by any suitable means such as that shown in the Blood Reissue Patent No. 20,634, dated January 25, 1938, in which dogs are fastened to the table to actuate a lever connected to the reversing valve.

As shown in Fig. 2, the cylinder of unit 4 includes an elongated barrel portion 16 whose open ends have internal beveled edges 17 and 18, said ends receiving the heads or caps 19 and 20, which are held in assembled relation with the barrel 16 by any suitable means such as a pair of tie rods 21, only one of which is shown in Fig. 1. One end cap 20 has rigid anchorage to base 1 by bolt 6 securing it to base portion 1b, but the other end cap 19, secured to base portion 1a by bolt 5, is formed with an upright slot 22 which is open on the upper side at 23, whereby a flexible arm 24 is provided between the cylinder and the base of the machine to which the said arm is fastened. The said arm 24 constitutes in effect a radius rod between the end cap proper and the base of the machine, whereby the cylinder is rigidly supported in all planes and yet is free to expand in the horizontal plane without subjecting the base 1 to any distortion or strain.

The cap 19 has cylindrical recesses 25 and 26, recess 25 being beveled at 27 for a purpose to be later described. Said cap 19 has ducts 28 and 29 for connecting the interior of the cylinder with fluid conduit 13. A bleeder duct 30 in the cap 19 is arranged to intercept the space or pocket 17' made by the bevel 17 of cylinder barrel 16 when the cap and cylinder are assembled. The other end cap 20 has a central aperture or bearing 31 appreciably larger in diameter than the piston rod 7 which passes therethrough; this bore 31 has a recess 32 which is connected by a passage 33 in head 20 with a drainage duct 34 leading to the exhaust conduit 15. The cap 20 also has ducts 35 and 36 corresponding with ducts 28 and 29 of head 19, for connecting the interior of the cylinder with fluid conduit 14. Also the cap 20 has a bleeder duct 37 which intercepts the space or pocket 18' made by the bevel 18 on the cylinder barrel when the cap and cylinder are assembled.

In hydraulic motors of the cylinder and piston type using an incompressible medium such as oil for the pressure fluid, there is always the possibility of air becoming trapped in the fluid and carried into the cylinder; as air is a compressible medium, it disrupts the action of the incompressible medium whereby uneven action is produced in the movement of the piston. In precision machine tools where uniform and even movement of the reciprocatory table or carriage is of paramount importance, this presence of air in the oil must always be guarded against. My invention secures constant collection and expulsion of all such air, by constantly bleeding off from the top of the cylinder, small quantities of oil, through the pockets 17' and 18'; the latter are connected by recesses 17" and 18" with the top of the cylinder space where the air, being the lighter of the two fluids, will always collect. By this bleeding action, all such air will be expelled from the system, along with small quantities of oil that bleed out through the ducts 30 and 37, the latter being connected as shown in Fig. 1 to the exhaust conduit 15 through which the oil flowing to reverse valve 12 from one end or the other of the cylinder is returned to the supply tank or sump, not shown. Said conduit 15 is provided, between valve 12 and the points where it is joined by bleed ducts 30 and 37, with a spring-closed check valve 15', through which fluid exhausting from either end of the cylinder passes freely to the sump until the volume of fluid is so small that the ball check valve 15' closes; thereupon the column of fluid in the conduit below the check valve creates a temporary sub-atmospheric pressure which drains off the fluid and air from the drain ducts 30 and 37.

As shown in Fig. 2, the piston 38 in cylinder 16 is preferably made in sections, there being as shown two end sections 39 and 41 with a spacer section 40 between them, the end sections being recessed at 42 and 43 respectively. Said end sections have reduced diameter portions 44 and 45 respectively of a width suitable for piston rings 46 and 47.

One of the major advantages of this multi-part piston is the ability to assemble the rings 46 and 47 therein without distorting them and thereby tending to destroy the true roundness with which they are manufactured. On the end section 41 is a hub portion 48 having a slight taper 49, terminating in a sharper bevel 50, as shown on a larger scale by Fig. 3—the purpose of this construction being hereinafter more fully described. After assembling the several sections and rings, the whole piston is mounted on the reduced end 51 of the piston rod 7 and secured thereto by means of a nut 52. Owing to the recesses 42 and 43 in the sections 39 and 41, the said sections are adapted to be sprung by tightening up on the nut 52 and thus the width of the spaces for the piston rings 46 and 47 can be varied as desired to obtain the proper fit with the rings. It is to be understood that the width of the piston rings and the spaces receiving them are finished to very close tolerances, so that any springing of the sections 39 and 41 will be of a minute amount and therefore will not appreciably affect the parallelism between the sides of the rings and the flanges defining the spaces.

In any such piston and cylinder unit, the ordinary practice of employing a stuffing box having packing around the piston rod to prevent leakage from the cylinder, involves considerable friction on the rod, due to the necessity of maintaining the packing as tight as possible against the rod. Such tight packing frequently scores the surface of the rod, and this in turn destroys the packing, so that both the rod and packing often need to be replaced. Another objection to the use of a stuffing box and packing is that the connection of the piston rod to the part which it actuates must be very accurately in line with the rod; should there be even a slight deviation from the alinement, the rod becomes sprung, a condition which increases the friction and the wear on the packing. In the present construction, these difficulties are intensified by the fact that the cylinder at its other end is given a certain limited freedom of movement (afforded by the flexible arm 24 as above described); such cylinder movement, by its effect on the path of the piston 38, is bound to cause more or less deviation of the piston rod from an absolutely straight line or rectilinear travel, and thus to make it all the more difficult to maintain a satisfactory packing against said rod. My invention overcomes this difficulty in the following manner:

A hollow tube 53 is telescoped over the piston rod 7 and is brazed or otherwise secured at 54 to the end section 39 of the piston. This tube 53 has a close sliding fit in the bearing 31, whereby there is substantially a metallic seal to keep the leakage from the cylinder to a minimum. Inasmuch as the tube 53 is a reciprocating member in the bearing 31, there is bound to be a small amount of oil adhering to it so that some of the oil would be carried beyond the end of the cap 20, there to drip off and be wasted, unless some means is provided to prevent this. In my improved construction such means has been provided by the recess 32 and passage 33, these being connected by duct 34 to the exhaust conduit 15 in which the aforesaid sub-atmospheric pressure created by the passage of the exhaust fluid from the cylinder, by drawing in a small amount of air through the outer portion of the bearing 31, acts to keep the oil from escaping at this end of the cylinder, despite the absence of packing. This action does not leave the tube 53 bone dry, but leaves an extremely thin film of oil on the said tube sufficient to keep it lubricated.

With the floating piston rod of the present construction, there is no opportunity of friction or wear due to displacement of its longitudinal axis. Furthermore, if there is any bending or whipping of the piston rod at the reversal of its stroke when it is suddenly put under compression, the present arrangement permits such bending to occur without causing any friction on the rod or on the tube bearing. That is to say, the tube 53, despite such action of the rod 7, maintains the piston in correct relation within the cylinder and the friction caused by the reciprocation of the tube in the bearing 31 is negligible as compared with the common practice of using a stuffing box for the piston.

As the piston 38 moves to the right and nears the end of its stroke, the hub 48 on the piston enters the recess 25 in the end cap 19. The diameter of the hub 48 is made just enough smaller than the recess 25 so that the oil trapped by the entry of the hub into the recess is gradually expelled at a rate to give the desired cushioning effect at the end of the stroke. When the valve 12 is again reversed and fluid flows to the right hand end of the cylinder, the piston will start to move to the left and this reverse movement tends to create a partial vacuum in the recess 25 which might cause the piston to jump as the hub leaves the recess, unless means were provided to gradually relieve the said partial vacuum. This means is provided by the slight taper 49 on the end of the hub 48. Soon after the piston 38 starts to move to the left, the beginning 49' of the taper on the hub passes the inner edge 27' of the bevel 27 and thus gradually opens the recess so that the slight vacuum is gradually relieved, allowing the piston to move smoothly without jump.

I claim:

In a machine tool or the like, a stationary base having slideways, a table reciprocable on said slideways, hydraulically actuated means carried by said base below said table for procuring said table's movement, said actuating means comprising a cylinder and a piston working therein, said piston being connected to said table, said cylinder at each end having a head element connecting it to and supporting it from said base, one of said head elements being slotted to provide between cylinder and base a substantially vertical connecting arm of relatively thin cross section, thereby to permit expansion of said cylinder in the absence of any distortion of the base and its slideways.

GHERALD D. SCOTT.